(12) United States Patent
Totsuka

(10) Patent No.: US 6,391,487 B1
(45) Date of Patent: May 21, 2002

(54) GAS DIFFUSION ELECTRODE, METHOD FOR MANUFACTURING THE SAME, AND FUEL CELL WITH SUCH ELECTRODE

(75) Inventor: Kazuhide Totsuka, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/482,107

(22) Filed: Jan. 13, 2000

(30) Foreign Application Priority Data

Jan. 13, 1999 (JP) ............................................ 11-006528
Feb. 15, 1999 (JP) ............................................ 11-036395

(51) Int. Cl.⁷ .............................. H01M 4/86; H01M 4/88
(52) U.S. Cl. ............................... 429/41; 429/42; 429/44
(58) Field of Search .................................... 429/40–42

(56) References Cited

U.S. PATENT DOCUMENTS 5,186,877 A * 2/1993 Watanabe ................... 264/104
5,346,780 A * 9/1994 Suzuki ......................... 429/42
6,074,773 A * 6/2000 Wilkinson ................... 429/41
6,087,032 A * 7/2000 Yoshitake .................... 429/33
6,187,467 B1 * 2/2001 Zhang .......................... 429/42

FOREIGN PATENT DOCUMENTS

JP          5109418 A  *  4/1993  ............ H01M/8/02
JP          6020709 A  *  1/1994  ............ H01M/8/02

* cited by examiner

Primary Examiner—Gabrielle Brouillette
Assistant Examiner—Mark Ruthkosky
(74) Attorney, Agent, or Firm—Sughrue Mion, PLLC (57) ABSTRACT

A gas diffusion electrode has a catalyst layer and a gas diffusion layer. The catalyst layer has a porous electrolyte A with pores which three-dimensionally communicate with one another. A micro-porous catalyst-electrolyte aggregate including a catalyst and an electrolyte B is provided in said pores.

6 Claims, 4 Drawing Sheets

GAS DIFFUSION ELECTRODE, METHOD FOR MANUFACTURING THE SAME, AND FUEL CELL WITH SUCH ELECTRODE

BACKGROUND OF THE INVENTION

1. Field of the Invention

The present invention relates to a gas diffusion electrode for use in a solid polymer electrolyte type fuel cell, a method for manufacturing the same, and a fuel cell with such an electrode.

2. Description of the Related Art

A solid polymer electrolyte type fuel cell is an electrochemical apparatus in which, for example, hydrogen is supplied as fuel to an anode and oxygen is supplied as oxidant to a cathode so that electric power is obtained by electrochemical reaction between the hydrogen and oxygen. The anode and cathode are gas diffusion electrodes. The anode is joined to one surface of an electrolyte membrane while the cathode is joined to the other surface of the same so that a gas diffusion-electrode/electrolyte-membrane assembly is formed.

Each gas diffusion electrode is constituted by a gas diffusion layer and a catalyst layer. The catalyst layer of each of the anode and cathode is provided with metal particles of the platinum group metal, carbon particles supporting such metal particles, or the like, as catalyst. Porous carbon paper, or the like, having hydrophobicity, is used for the gas diffusion layer. An single cell as a basic unit is formed by a structure in which such a gas diffusion-electrode/electrolyte-membrane assembly is held between a pair of gas impermeable separators provided with gas feed channels. A solid polymer electrolyte type fuel cell is formed by stack of a plurality of such single cells.

When a solid polymer electrolyte type fuel cell is operated, the following electrochemical reactions proceed.

Generally, in such a fuel cell in which oxygen and hydrogen are made to react with each other, the fact that activation overvoltage in the oxygen reductive reaction is high is one of the reasons for lowering voltage in high current density. Therefore, a catalyst such as platinum group metal or the like is added to each electrode in order to reduce the activation overvoltage.

In such a solid polymer electrolyte type fuel cell having a solid polymer electrolyte membrane, the electrochemical reactions in the anode and cathode proceed in so-called three-phase interfaces formed by the catalyst, the electrolyte, and reactants which are included in the cathode and anode. Therefore, in order to obtain high power in such a fuel cell, it is requested to increase the contact area between the catalyst and the electrolyte.

Methods in which irregularities are provided on the surface of an electrolyte membrane so as to increase the contact area between each electrode including the catalyst and the electrolyte membrane, particularly between a catalyst layer in the electrode and the electrolyte membrane have been devised in order to obtain high power in a solid polymer electrolyte type fuel cell. One of those methods is a method in which the surface area of a solid polymer electrolyte membrane is increased so as to increase the contact area between the electrolyte membrane and each electrode. There has been proposed a method for giving irregularities onto the surface of a solid polymer electrolyte membrane, for example, by such a method using a roll with irregularities as disclosed in JP-A-3-158486, by such a method using sputtering as disclosed in JP-A-4-169069, by such a method using plasma etching as disclosed in JP-A-4-220957, or by such a method of embedding cloth and then peeling the embedded cloth as disclosed in JP-A-6-279600.

There is another method in which pores are provided on the surface of a solid polymer electrolyte membrane so as to increase the contact area between the electrolyte membrane and a catalyst layer. For example, JP-A-58-7432 discloses a method in which a dispersion medium dissolving an electrolyte is crystallized into droplets and then these droplets are removed from the electrolyte, JP-A-62-146926 discloses a method in which particles are embedded in an electrolyte and then removed from the electrolyte, and JP-A-5-194764 discloses a method in which organic material is mixed with an electrolyte and then removed from the electrolyte.

There is a further method in which platinum group metal is supported on the surface of an electrolyte membrane so as to increase the contact interface between the electrolyte and a catalyst. For example, JP-B-59-42078 or JP-B-2-43830 discloses a method in which electroless plating is given to the surface of an electrolyte. Further, there is a method in which an electrolyte is added to a catalyst layer so as to increase the contact area between the catalyst and the electrolyte. For example, JP-B-2-7398 discloses a method in which an electrode is produced out of a mixture of an electrolyte solution and fluorocarbon resin such as PTFE or the like, and JP-B-2-7399 discloses a method in which an electrode is produced out of a catalyst coated with an electrolyte and fluorocarbon resin such as PTFE or the like. In addition, U.S. Pat. No. 5,211,984 discloses a method in which an electrode is produced out of a mixture of a catalyst and an electrolyte solution.

In such a method using a roll, such a method using sputtering, such a method using plasma etching and such a method using cloth, as described previously, there was a problem that the processing for providing irregularities was so troublesome that the productivity deteriorates, or the formed irregularities are too rough to increase enough the contact area of the interface between an electrolyte membrane and each electrode.

In a method in which pores are formed by removing a crystallized dispersion medium, planted particles or mixed organic material, it is difficult to completely remove the dispersion medium, particles or organic material. Such a residue becomes an obstacle to the contact between an electrolyte membrane and each electrode or to ion conduction between the electrodes. Heating treatment or solvent treatment performed in a process of removing such a residue causes deterioration in the ion conductivity. For these reasons, in a fuel cell manufactured by use of an electrolyte membrane in which the contact area was increased by the conventional method, there was a problem that the improvement of the performance was not sufficient.

Platinum group metal formed on the surface of an electrolyte membrane by a method using electroless plating or the like was low in activity as a fuel cell catalyst due to its small surface area, so that the improvement of the catalyst activity was not sufficient in this method.

J. Electrochem. Soc., 140, 3513 (1993) indicates a problem in a catalyst layer consisting of a catalyst and an electrolyte. That is, in such a catalyst layer, the resistance to proton conduct is large, and portions which are not much affected by the lowering of voltage due to the resistance to proton conduct are concentrated in the vicinity of the electrolyte membrane. If the catalyst quantity of the catalyst layer is increased, the thickness of the catalyst layer is also increased. As a result, the influence of the lowering of voltage due to the resistance to proton conduct of the catalyst layer becomes strong in high current density. Therefore, the characteristics of the catalyst layer cannot be improved simply only by increasing the catalyst quantity.

SUMMARY OF THE INVENTION

It is an object of the present invention to form a large number of so-called three-phase interfaces where electrode reactions proceed in accordance with the increase of the catalyst quantity of a catalyst layer so as to reduce activation overvoltage. It is another object of the present invention to improve the proton conductivity of the catalyst layer so as to reduce the lowering of voltage due to the resistance to proton shift. It is another object of the present invention to form appropriate pores in the catalyst layer so as to improve the property of feeding reactants to the three-phase interfaces to thereby reduce the concentration overvoltage. It is a further object of the present invention to provide a high-power fuel cell through these improvements.

A fuel cell gas diffusion electrode according to the present invention has a catalyst layer and a gas diffusion layer. The catalyst layer is produced in the following manner. A porous electrolyte A with pores three-dimensionally communicating with one another is formed, and then a micro-porous catalyst-electrolyte aggregate including a catalyst and an electrolyte B is provided in the pores of the porous electrolyte A. This porous electrolyte A is produced by a method capable of preventing lowering of the ion conductivity due to the mixing of impurities or deterioration.

Perfluorosulfonic resin having proton conductivity is used as electrolyte in the solid polymer electrolyte type fuel cell. Generally, this electrolyte has a characteristic that the proton conductivity is high if the ion exchange capacity is high, and on the other hand, the solubility of reactants such as oxygen or the like is high if the ion exchange capacity is low. With this characteristic, the proton conductivity of the electrolyte contained in the catalyst layer and the property of feeding the reactant are improved separately in accordance with the respective functions. As a result, the proton conductivity of the catalyst layer as a whole and the property of feeding the reactant are improved.

That is, the porous electrolyte A with pores three-dimensionally communicating with one another is formed in the catalyst layer out of an electrolyte which is relatively large in the ion exchange capacity and high in the proton conductivity. Thus, the proton conductivity is improved. A catalyst coated with the electrolyte B which is relatively small in the ion exchange capacity and large in the solubility of the reactant is provided in the pores of the porous electrolyte A. Thus, the property of feeding the reactant to the three-phase interfaces is improved.

According to a first aspect of the present invention, there is provided a gas diffusion electrode comprising a catalyst layer and a gas diffusion layer, wherein the catalyst layer has a porous electrolyte A with pores which three-dimensionally communicate with one another, and a micro-porous catalyst-electrolyte aggregate including a catalyst and an electrolyte B is provided in the pores.

According to a second aspect of the present invention, there is provided a method for manufacturing a gas diffusion electrode, in which a micro-porous catalyst-electrolyte aggregate including a catalyst and an electrolyte B is provided in pores of a porous electrolyte A which three-dimensionally communicate with one another.

According to a third aspect of the present invention, there is provided a gas diffusion electrode comprising a catalyst layer and a gas diffusion layer, wherein the catalyst layer has a structure in which a porous electrolyte A with pores three-dimensionally communicating with one another is provided, and a micro-porous catalyst-electrolyte aggregate including a catalyst and an electrolyte B is provided in the pores, the porous electrolyte A having an ion exchange capacity which is larger than an ion exchange capacity of the electrolyte B in the pores of the porous electrolyte A.

According to a fourth aspect of the present invention, there is provided a gas diffusion electrode of the first or third aspect, wherein the porous electrolyte A and said electrolyte B in said pores of said porous electrolyte A comprises perfluorosulfonic resin.

According to a fifth aspect of the present invention, there is provided a solid polymer electrolyte type fuel cell comprising a gas diffusion electrode of the first, third or fourth aspect.

DETAILED DESCRIPTION OF THE INVENTION

Detailed description of the present invention will be described as follows.

A configuration of a gas diffusion electrode according to the present invention will be described. A porous electrolyte A with pores three-dimensionally communicating with one another is formed of a polymer electrolyte having proton conductivity. The pores of the porous electrolyte are made to include a catalyst and an electrolyte B. The catalyst and the electrolyte B forms a micro-porous catalyst-electrolyte aggregate. The pore size of the porous electrolyte with pores which three-dimensionally communicate with one another is 0.1 to 10 $\mu$m, namely, micro meter order. On the other hand, the pore size formed in the micro-porous catalyst-electrolyte aggregate is several ten to several hundred nm, namely, nano order. The porous electrolyte A having the micro-porous catalyst-electrolyte aggregate in its pores forms a catalyst layer. The catalyst layer and a gas diffusion layer are joined with each other. Thus, a gas diffusion electrode is formed.

The proton conductivity of the catalyst layer of the gas diffusion electrode according to the present invention becomes high because the porous electrolyte A with pores three-dimensionally communicating with one another forms channels for proton conduction. The micro-porous catalyst-electrolyte aggregate provided in the pores forms a large number of three-phase interfaces because the electrolyte B covers the catalyst appropriately. As a result, this catalyst layer has a high proton conductivity and forms a large number of three-phase interfaces. If the porous electrolyte A is formed of an electrolyte having a large ion exchange capacity, the proton conductivity of the catalyst layer is further improved. In addition, if an electrolyte having a small ion exchange capacity is used for the electrolyte B, the property of feeding reactant such as oxygen or the like to reaction sites is further improved.

The pores of the porous electrolyte A are formed so as to communicate with one another three-dimensionally in the thickness and facial directions of the porous electrolyte A. The porous electrolyte A forms a skeleton structure like a three-dimensional network, in which the pores communicate with one another three-dimensionally in the thickness and facial directions of the porous electrolyte A. This structure is suitable for forming a series of proton conduction channels. Since the porous electrolyte A has small-pores formed three-dimensionally, the surface area of the porous electrolyte A is extremely large. As a result, the contact area where protons are transferred between the porous electrolyte A and the electrolyte B contained in the micro-porous catalyst-electrolyte aggregate becomes large. In this catalyst layer, protons taking part in reactions conduct their positions in the porous electrolyte A which has a high proton conductivity. Thus, proton conduct becomes shortest in the electrolyte B having a relatively low proton conductivity, so that the lowering of voltage due to proton conduct in the catalyst layer can be reduced to a minimum. The porous electrolyte A and the electrolyte B are formed of ion exchange resin having proton conductivity. For example, perfluorosulfonic acid resin or the like may be used for the electrolytes A and B.

In the catalyst layer of the gas diffusion electrode according to the present invention, the micro-porous catalyst-electrolyte aggregate provided in the pores of the porous electrolyte A which communicate with one another three-dimensionally may contain hydrophobic particles such as PTFE or the like, or electrically conductive particles such as carbon, metal or the like. It is essential that the micro-porous catalyst-electrolyte aggregate including at least the catalyst and the electrolyte B is provided in the pores of the porous electrolyte A. As the catalyst, platinum group metals, alloys or oxides thereof, or any substance in which those platinum group metals, alloys or oxides thereof are supported by a support such as carbon or the like having electrical conductivity can be used.

Figure 1:
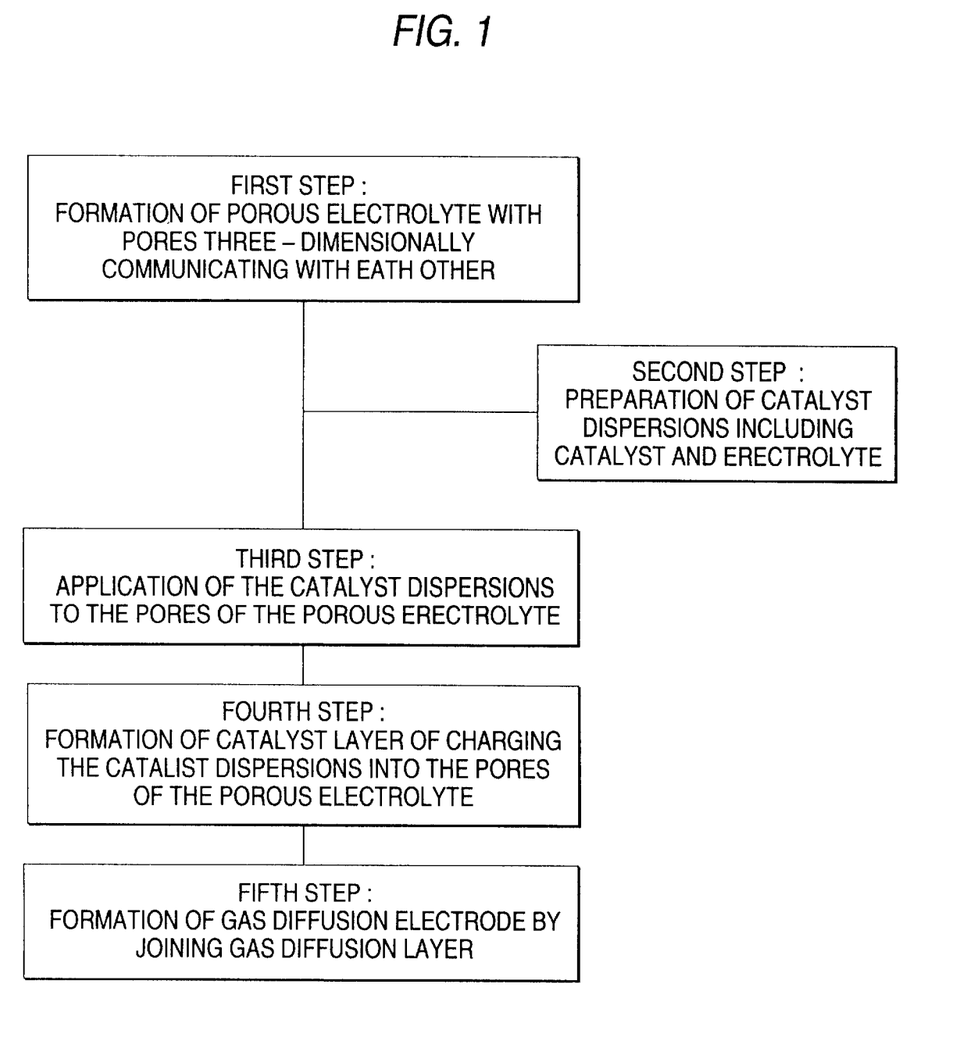
FIG. 1 is a flow chart showing a process for manufacturing a gas diffusion electrode according to the present invention.

FIG. 1 shows an example of manufacturing process of the gas diffusion electrode according to the present invention. The manufacturing process will be described in five steps. In the first step, the porous electrolyte A with pores three-dimensionally communicating with one another is formed. In the second step, catalyst dispersions dispersed into a solution including a catalyst such as a platinum supporting carbon catalyst or the like and the electrolyte B are prepared. In the third step, the catalyst dispersions are loaded into the pores of the porous electrolyte A which communicate with one another three-dimensionally. In the fourth step, by a method of application of pressure or the like, the catalyst dispersions are charged deep into the pores of the porous electrolyte A which communicate with one another three-dimensionally. Thus, a catalyst layer having a micro-porous catalyst-electrolyte aggregate composed of the catalyst and the electrolyte B is formed in and over the pores of the porous electrolyte A. In the fifth step, carbon paper provided with hydrophobicity as a gas diffusion layer is joined to the catalyst layer. Thus, a gas diffusion electrode is completed.

Next, a method of manufacturing the gas diffusion electrode according to the present invention will be described specifically.

In the first step, at least one surface of an electrolyte membrane is coated with a solution of an electrolyte dissolved in a solvent containing alcohol. After that, the coated electrolyte membrane is immersed in an organic solvent containing polar groups other than alcohol hydroxyl groups. Thus, the porous electrolyte A with pores three-dimensionally communicating with one another is manufactured.

This electrolyte solution is obtained by dissolving perfluorosulfonic resin in a mixture solvent of water and alcohol. For example, 5 wt % Nafion solution (USA, Aldrich Chemical Company) which is the solution of perfluorosulfonic resin available on the market may be used. This electrolyte solution can be prepared in a desired concentration by a method of dilution, concentration or the like. That is, there is a method of dilution by adding alcohol, water or a mixture of them to the electrolyte solution, or a method of concentration by removing parts of the solvent from the electrolyte solution by heating or other means. In this case, as the alcohol, methanol, ethanol, 1-propanol, 2-propanol, 1-butanol or 2-butanol having a carbon number of 4 or less can be used.

Incidentally, in this embodiment, perfluorosulfonic acid resin is used as a materiel for the porous electrolyte used in the present invention. However, in addition to this, it is possible to use any one of suitable cation exchange resins such as styrene-divinylbenzensulfon type ion exchange resin.

Examples of the organic solvent containing polar groups other than alcohol hydroxyl groups include: organic solvents in which the carbon numbers of carbon chains having alkoxycarbonyl groups in their molecules are in a range of from 1 to 7, such as singles or mixtures of propyl formate, butyl formate, isobutyl formate, ethyl acetate, propyl acetate, isopropyl acetate, allyl acetate, butyl acetate, isobutyl acetate, pentyl acetate, isopentyl acetate, methyl propionate, ethyl propionate, propyl propionate, methyl acrylate, butyl acrylate, isobutyl acrylate, methyl butyrate, methyl isobutyrate, ethyl butyrate, ethyl isobutyrate, methyl methacrylate, propyl butyrate, isopropyl isobutyrate, 2-ethoxyethyl acetate, 2-(2-ethoxyethoxy)ethyl acetate, etc.; organic solvents in which the carbon numbers of carbon chains having ether linkages in their molecules are in a range of from 3 to 5, such as singles or mixtures of dipropyl ether, dibutyl ether, ethylene glycol dimethyl ether, ethylene glycol diethyl ether, tripropylene glycol monomethyl ether, tetrahydrofuran, etc.; organic solvents in which the carbon numbers of carbon chains having carbonyl groups in their molecules are in a range of from 4 to 8, such as singles or mixtures of methyl butyl ketone, methyl isobutyl ketone, methyl hexyl ketone, dipropyl ketone, etc.; organic solvents in which the carbon numbers of carbon chains having amino groups in their molecules are in a range of from 1 to 5, such as singles or mixtures of isopropylamine, isobutylamine, tertiary butylamine, isopentylamine, dimethylamine, etc.; organic solvents in which the carbon numbers of carbon chains having carboxyl groups in their molecules are in a range of from 1 to 6, such as singles or mixtures of propanoic acid, valeric acid, caproic acid, heptoic acid, etc.; or combinations of these organic solvents. As the organic solvent containing polar groups, other than alcohol hydroxyl groups, for use for forming the porous electrolyte A with pores three-dimensionally communicating with one another, however, the solvents having alkoxycarbonyl groups are preferable.

In the second step, the catalyst dispersions are prepared by dispersing a catalyst into a dispersion medium, and then an electrolyte solution is added thereto and the mixture is prepared. As the catalyst, carbon supporting platinum group metal, platinum group metals, oxides of the platinum group metals, or mixtures of these catalysts can be used. As the dispersion medium, methanol, ethanol, 1-propanol, 2-propanol, 1-butanol, 2-butanol, etc. which are alcohol having a carbon number of 4 or less; water; or mixtures of these media can be used. As the electrolyte solution, 5 wt % Nafion solution (USA, Aldrich Chemical Company), which is perfluorosulfonic resin available on the market and in which perfluorosulfonic resin is dissolved in a mixture solvent of water and alcohol, may be used.

In the third step, the catalyst dispersions prepared in the second step are loaded into the pores of the porous electrolyte A which communicate with one another three-dimensionally. This step may be achieved by use of a conventionally known coating method, such as a spraying method, a doctor blade method, a screen printing method, a depositing method, an impregnating method or the like.

In the fourth step, by a method of applying pressure to the porous electrolyte A with pores which three-dimensionally communicate with one another and which are loaded with the catalyst dispersions, or by any other method, the catalyst dispersions are charged deep into the pores of the porous electrolyte A which communicate with one another three-dimensionally. After that, the solvent and the dispersion medium are removed from the catalyst dispersions. Thus, a micro-porous catalyst-electrolyte aggregate including the catalyst and the electrolyte B is formed. In such a manner, the catalyst layer having the micro-porous catalyst-electrolyte aggregate in the pores of the porous electrolyte A is formed. Thus, the catalyst layer having the micro-porous catalyst-electrolyte aggregate including the catalyst and the electrolyte B is formed. The application of pressure can be performed by means of, for example, flat press, roll press, etc.

In the fifth step, a gas diffusion layer is joined to the catalyst layer produced in the fourth step by heating pressing. Thus, a gas diffusion electrode according to the present invention is manufactured. As the gas diffusion layer, carbon paper with hydrophobicity, or a sheet formed of carbon powder by using fluorocarbon resin such as PTFE, etc.

Figure 2:
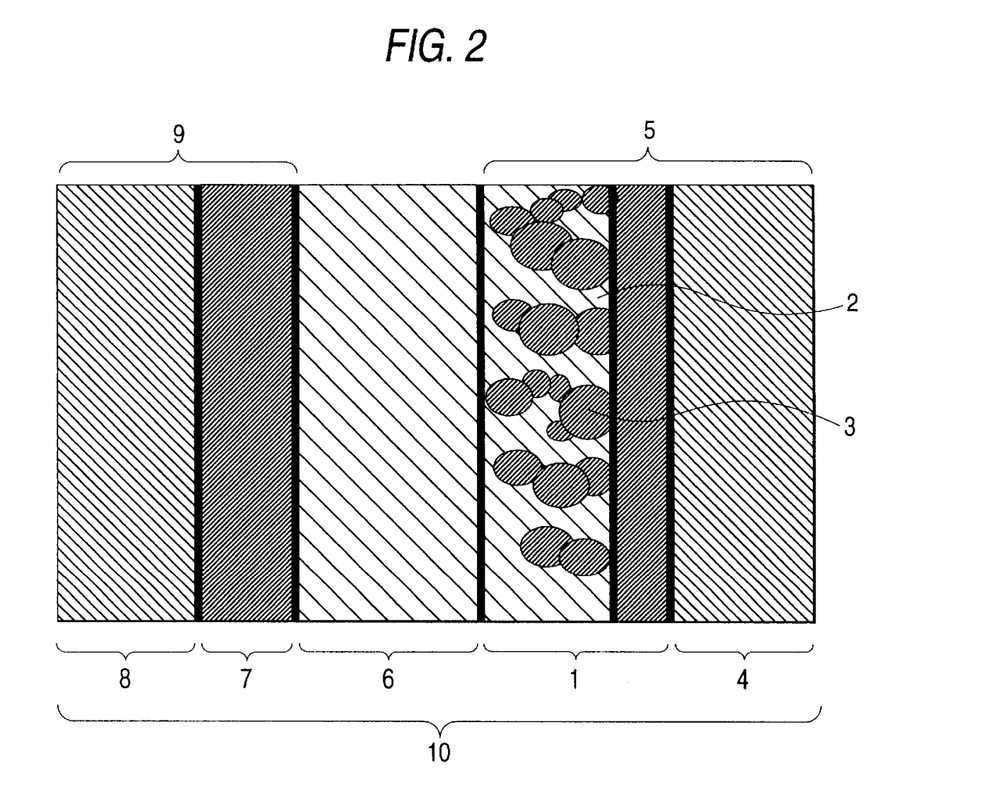
FIG. 2 is a schematic sectional view of a gas diffusion-electrode/electrolyte-membrane assembly according to the present invention.

FIG. 2 is a schematic sectional view of a gas diffusion-electrode/electrolyte-membrane assembly in which a gas diffusion electrode according to the present invention is provided on one surface of an electrolyte membrane, as one of examples of the present invention. In FIG. 2, the reference numeral 1 represents a first catalyst layer; 2, a porous electrolyte A with pores three-dimensionally communicating with one another; and 3, a micro-porous catalyst-electrolyte aggregate containing a catalyst and an electrolyte B. The micro-porous catalyst-electrolyte aggregate 3 containing the catalyst and the electrode B is held in the pores of the porous electrolyte A which three-dimensionally communicate with one another. The reference numeral 4 represents a first gas diffusion layer; and 5, a first gas diffusion electrode. The first gas diffusion electrode 5 is based on the present invention, in which the first gas diffusion layer 4 is joined to the first catalyst layer 1.

The reference numeral 6 is an electrode membrane, which has the first gas diffusion electrode 5 according to the present invention on its one side, and a second gas diffusion electrode 9 on the other side. In the second gas diffusion electrode 9, a second gas diffusion layer 8 is joined to a second catalyst layer 7. The second catalyst layer 7 is, for example, composed of catalyst dispersions including a catalyst and an electrolyte. The second gas diffusion layer 8 is, for example, formed of the same materials as those of the first gas diffusion layer 4.

The first gas diffusion electrode 5 is put on one surface of the electrolyte membrane 6 while the second gas diffusion electrode 9 is put on the other surface. Thus, gas diffusion-electrode/electrode-membrane assembly 10 is formed. A Nafion 115 membrane (produced by DuPont Company, U.S.A.) which is a perfluorosulfonic resin membrane having proton conductivity may be used as the electrolyte membrane 6. Nafion is a registered trademark of DuPont Company.

Figure 3:
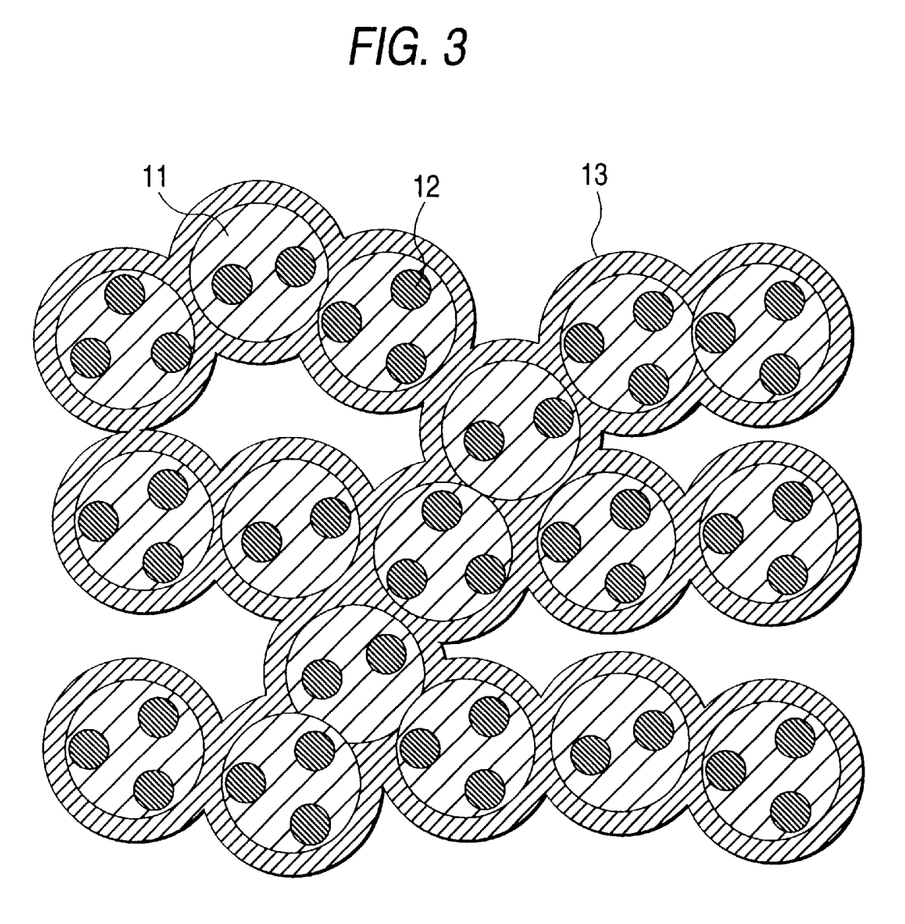
FIG. 3 is a schematic enlarged view of a micro-porous catalyst-electrolyte aggregate including a catalyst and an electrolyte B provided in pores of a porous electrolyte A which communicate with one another three-dimensionally.

FIG. 3 shows an enlarged schematic view of the microporous catalyst-electrolyte aggregate 3 in the pores of the porous electrolyte A which communicate with one another three-dimensionally. In FIG. 3, the reference numeral 11 represents a carbon support; 12, a catalyst; and 13, an electrolyte B covering the catalyst. For example, carbon black is used for the carbon support 11. The catalyst 12 is of single or alloy particles of platinum group metal such as platinum or the like. Fine powder of platinum group metal or an alloy thereof, for example, platinum black powder can be used as the catalyst. The electrolyte B 13 covering the catalyst is appropriately applied on and near the surface of the catalyst 12 so as to form three-phase interfaces in which electrochemical reactions proceed. The electrolyte B 13 also acts as binder.

EXAMPLE 1

An example of the method for manufacturing a gas diffusion electrode according to the present invention will be shown specifically. The manufacturing method will be described below in five steps as shown in FIG. 1.

In the first step, a layer of a porous electrolyte A1 with pores three-dimensionally communicating with one another was formed on one side of an electrolyte membrane. First, perfluorosulfonic acid resin having an ion exchange capacity of 0.91 (m·eq/g·dry resin) was dissolved to prepare an electrolyte solution. 5 g of perfluorosulfonic acid resin was heated and pressured to 240° C. in an autoclave and dissolved in 100 g of a mixture solvent of ethanol and water (ethanol:water=9:1). The concentration of the solution was adjusted to 16 wt % so that an electrolyte solution A was obtained. Next, a Nafion 115 membrane available on the market was cleaned with purified water three times. Then, the Nafion 115 membrane was boiled in 3% hydrogen peroxide water for 1 hour as degreasing treatment, and cleaned with purified water several times. Further, the Nafion 115 membrane was boiled in 0.5 M of sulfuric acid for 1 hour as protonating treatment, and cleaned with purified water several times. After that, the Nafion 115 membrane was kept in purified water.

Succeedingly, this Nafion 115 membrane was subjected to ethanol treatment. That is, the Nafion 115 membrane was immersed in ethanol for 10 minutes to thereby swell sufficiently. The Nafion 115 membrane subjected to the protonating treatment and ethanol treatment was taken out from ethanol. Excessive ethanol existing on the surface of the Nafion 115 membrane which was in a swelling state was wiped with filter paper. Then, the electrolyte solution A was sprayed onto one side of the Nafion 115 membrane to form a coating layer of the electrolyte solution A before the Nafion 115 membrane was dried. At that time, the coating amount of the electrolyte solution A was about 3 mg/cm$^2$.

The Nafion 115 membrane on which the coating layer of the electrolyte solution A was formed was immersed in butyl acetate for 10 minutes. Then, the Nafion 115 membrane was taken out and dried in room temperature so that a porous electrolyte A1 with pores three-dimensionally communicating with one another was formed on the surface of the Nafion 115 membrane. This portion of the porous electrolyte A1 with pores three-dimensionally communicating with one another had a diameter of 3.5 cm and a thickness of about 6 μm.

In the second step, catalyst dispersions were prepared. 13 ml of 5 wt % Nafion solution (produced by Aldrich Company, U.S.A.) was gradually added to 1.5 g of carbon catalyst supporting 30 wt % of platinum while being agitated. The ion exchange capacity of the solution was 0.91 (m·eq/g·dry resin). They were further agitated for 30 minutes so as to be mixed sufficiently. During this period, they were heated to 60° C. and concentrated so that the weight of the solid content of Nafion was 15 wt % to the dispersion medium. Thus, catalyst dispersions A1 were prepared.

In the third step, the catalyst dispersions A1 were given into the pores of the porous electrolyte A1 which communicate with one another three-dimensionally. The Nafion 115 membrane which was produced in the first step so as to be coated with the porous electrolyte A1 with pores three-dimensionally communicating with one another was disposed on a flat plate of glass or the like so that the surface, in which the porous electrolyte A1 with pores three-dimensionally communicating with one another was formed, was made to face up. With a doctor blade having a gap adjusted to 15 μm, the catalyst dispersions A1 produced in the second step was applied to the porous electrolyte A1 with pores three-dimensionally communicating with one another. Next, a part of the catalyst dispersions A1 applied to the porous electrolyte A1 with pores three-dimensionally communicating with one another was left like a circle with a diameter of 3 cm while the other unnecessary portions of the catalyst dispersions A1 were removed. Thus, an electrolyte-membrane/catalyst dispersions coated body A was formed.

On the other hand, a peeling paper/catalyst dispersions coated body A in which a catalyst layer was formed on peeling paper was produced. The producing method was as follows. 13 ml of 5 wt % Nafion solution (produced by Aldrich Company, U.S.A.) was gradually added to 1.5 g of carbon catalyst supporting 30 wt % of platinum while being agitated. They were further agitated for 30 minutes. They were heated to 60° C. while being further agitated and concentrated so that the weight of the solid content of Nafion was 18 wt % to the dispersion medium. Thus, catalyst dispersions A2 were prepared. This catalyst dispersions A2 were applied to a tetrafluoroethylene-hexafluoropropylene copolymer sheet by screen application. Thus, the peeling paper/catalyst dispersions coated body A was produced, and cut into a circle with a diameter of 3 cm.

In the fourth step, a catalyst layer having a micro-porous catalyst-electrolyte aggregate in the pores of the porous electrolyte A1 which communicate with one another three-dimensionally was produced. The electrolyte-membrane/catalyst dispersions coated body A and the peeling paper/catalyst dispersions coated body A which were produced in the third step were laminated on each other and disposed on a pressing machine. At that time, they were laminated so that the coating surface of the peeling paper/catalyst dispersions coated body was on the electrolyte membrane side, and the coating surfaces of the respective coated bodies met each other through the electrolyte membrane. In this state, they were heated and pressure-welded by 250 kg/cm$^2$ at 135° C. for 5 minutes. As a result, the catalyst layer of the peeling paper/catalyst dispersions coated body A was transferred from the peeling paper to the electrolyte membrane. The catalyst dispersions A1 applied to the surface of the electrolyte-membrane/catalyst dispersions coated body A were charged into the pores of the porous electrolyte A1 which communicate with one another three-dimensionally. Thus, a catalyst layer having a micro-porous catalyst-electrolyte aggregate including the catalyst and the electrolyte B in the pores was formed.

Thus, a catalyst-layer/electrolyte-membrane assembly A was formed so that a catalyst layer having the porous electrolyte A1 and the micro-porous catalyst-electrolyte aggregate in the pores of the porous electrolyte A1 was provided on one side of the Nafion 115 membrane while a catalyst layer composed of the catalyst dispersions A2 was provided on the other side. This catalyst-layer/electrolyte-membrane assembly was regarded as a catalyst-layer/electrolyte-membrane assembly A according to the present invention.

In the fifth step, gas diffusion layers were joined. Carbon paper having hydrophobicity was cut into circles with a diameter of 3 cm as gas diffusion layers respectively, disposed on opposite sides of the catalyst-layer/electrolyte-membrane assembly A, and joined integrally by heating and pressure welding by 120 Kg/cm$^2$, at 135° C. for 5 minutes. Thus, a gas diffusion-electrode/electrolyte-membrane assembly A was produced. The carbon paper used thus was 0.2 mm thick. This carbon paper was impregnated with fluid dispersion of polytetrafluoroethylene, dried, and then burned at 400° C. so that hydrophobicity was given to the carbon paper.

The gas diffusion-electrode/electrolyte-membrane assembly A was held between metal separators in which gas feeding channels were formed. Thus, a solid polymer electrolyte type fuel cell A was formed. In the solid polymer electrolyte type fuel cell A, the catalyst layer according to the present invention was used as a cathode. The amount of catalyst in the cathode was about 0.2 mg/cm$^2$, and the amount of catalyst in the anode was about 0.2 mg/cm$^2$.

EXAMPLE 2

A gas diffusion electrode according to the present invention including a porous electrode A having a large ion exchange capacity was produced in the following manner. In this gas diffusion electrode, the ion exchange capacity of the porous electrode A is larger than that of an electrolyte B included in a micro-porous catalyst-electrolyte aggregate. The manufacturing method was performed in the same manner as in Example 1.

In the first step, a layer of a porous electrolyte A2 with pores three-dimensionally communicating with one another was formed on one side of an electrolyte membrane in the same manner as in Example 1. First, perfluorosulfonic acid resin having an ion exchange capacity of 1.11 (me·eq/g·dry resin) was dissolved to prepare an electrolyte solution. 5 g of perfluorosulfonic acid resin was heated and pressured to 240° C. in an autoclave and dissolved in 100 g of a mixture solvent of ethanol and water (ethanol:water=9:1). The concentration of the solution was adjusted to 16 wt % so that an electrolyte solution B was obtained.

Next, a Nafion 115 membrane was cleaned with purified water three times. Then, the Nafion 115 membrane was boiled in 3% hydrogen peroxide water for 1 hour as degreasing treatment, and cleaned with purified water several times. Further, the Nafion 115 membrane was boiled in 0.5 M of sulfuric acid for 1 hour as protonating treatment, and cleaned with purified water several times. After that, the Nafion 115 membrane was kept in purified water.

Succeedingly, this Nafion 115 membrane was subjected to ethanol treatment. That is, the Nafion 115 membrane was immersed in ethanol for 10 minutes to thereby swell sufficiently. The Nafion 115 membrane subjected to the protonating treatment and ethanol treatment was taken out from ethanol. Excessive ethanol existing on the surface of the Nafion 115 membrane which was in a swelling state was wiped with filter paper. Then, the electrolyte solution B was sprayed onto one side of the Nafion 115 membrane to form a coating layer of the electrolyte solution B before the Nafion 115 membrane was dried. At that time, the coating amount of the electrolyte solution B was about 3 mg/cm$^2$.

The Nafion 115 membrane on which the coating layer of the electrolyte solution B was formed was immersed in butyl acetate for 10 minutes. Then, the Nafion 115 membrane was taken out and dried in room temperature so that a porous electrolyte A2 with pores three-dimensionally communicating with one another was formed on the surface of the Nafion 115 membrane. This portion of the porous electrolyte A2 with pores three-dimensionally communicating with one another had a diameter of 3.5 cm and a thickness of about 6 $\mu$m.

In the second step, catalyst dispersions were prepared. 13 ml of 5 wt % Nafion solution (produced by Aldrich Company, U.S.A.) was gradually added to 1.5 g of carbon catalyst supporting 30 wt % of platinum while being agitated. They were further agitated for 30 minutes so as to be mixed sufficiently. During this period, they were heated to 60° C. and concentrated so that the weight of the solid content of Nafion was 15 wt % to the dispersion medium. Thus, the same catalyst dispersions A1 as in Example 1 were prepared.

In the third step, the catalyst dispersions A1 were given into the pores of the porous electrolyte A2 which communicate with one another three-dimensionally. The Nafion 115 membrane which was produced in the first step so as to be coated with the porous electrolyte A2 with pores three-dimensionally communicating with one another was disposed on a flat plate of glass or the like so that the surface, in which the porous electrolyte A2 with pores three-dimensionally communicating with one another was formed, was made to face up. With a doctor blade having a gap adjusted to 15 $\mu$m, the catalyst dispersions A1 produced in the second step was applied to the porous electrolyte A2 with pores three-dimensionally communicating with one another. Next, a part of the catalyst dispersions A1 applied to the porous electrolyte A2 with pores three-dimensionally communicating with one another was left like a circle with a diameter of 3 cm while the other unnecessary portions of the catalyst dispersions A1 were removed. Thus, an electrolyte-membrane/catalyst dispersions coated body B was formed.

On the other hand, a peeling paper/catalyst dispersions coated body A in which a catalyst layer was formed on peeling paper was produced in the same manner as in Example 1. The producing method was as follows. 13 ml of 5 wt % Nafion solution (produced by Aldrich Company, U.S.A.) was gradually added to 1.5 g of carbon catalyst supporting 30 wt % of platinum while being agitated. They were agitated for 30 minutes. The ion exchange capacity of the solution was 0.91 (m·eq/g·dry resin). On this occasion, they were heated to 60° C. while being agitated and concentrated so that the weight of the solid content of Nafion was 18 wt % to the dispersion medium. Thus, catalyst dispersions A2 were prepared. This catalyst dispersions A2 were applied to a tetrafluoroethylene-hexafluoropropylene copolymer sheet by screen application. Thus, the peeling paper/catalyst dispersions coated body A was produced, and cut into a circle with a diameter of 3 cm.

In the fourth step, a catalyst layer having a micro-porous catalyst-electrolyte aggregate in the pores of the porous electrolyte A2 which communicate with one another three-dimensionally was produced. The electrolyte-membrane/catalyst dispersions coated body B and the peeling paper/catalyst dispersions coated body A which were produced in the third step were laminated on each other and disposed on a pressing machine. At that time, they were laminated so that the coating surface of the peeling paper/catalyst dispersions coated body A was on the electrolyte membrane side, and the coating surfaces of the respective coated bodies met each other through the electrolyte membrane. In this state, they were heated and pressure-welded by 250 kg/cm$^2$ at 135° C. for 5 minutes. As a result, the catalyst layer of the peeling paper/catalyst dispersions coated body A was transferred from the peeling paper to the electrolyte membrane. The catalyst dispersions A1 applied to the surface of the electrolyte-membrane/catalyst dispersions coated body A were charged into the pores of the porous electrolyte A1 which communicate with one another three-dimensionally. Thus, a catalyst layer having a micro-porous catalyst-electrolyte aggregate including the catalyst and the electrolyte B in the pores was formed.

Thus, a catalyst-layer/electrolyte-membrane assembly B was formed so that a catalyst layer having the porous electrolyte A2 and the micro-porous catalyst-electrolyte aggregate in the pores of the porous electrolyte A2 was provided on one side of the Nafion 115 membrane while a catalyst layer composed of the catalyst dispersions A2 was provided on the other side. This catalyst-layer/electrolyte-membrane assembly was regarded as a catalyst-layer/electrolyte-membrane assembly B according to the present invention.

In the fifth step, gas diffusion layers were joined. Carbon paper having hydrophobicity was cut into circles with a diameter of 3 cm as gas diffusion layers respectively, disposed on opposite sides of the catalyst-layer/electrolyte-membrane assembly B, and joined integrally by heating and pressure welding by 120 Kg/cm$^2$, at 135° C. for 5 minutes. Thus, a gas diffusion-electrode/electrolyte-membrane assembly B was produced. The carbon paper used thus was 0.2 mm thick. This carbon paper was impregnated with fluid dispersion of polytetrafluoroethylene, dried, and then burned at 400° C. so that hydrophobicity was given to the carbon paper.

The gas diffusion-electrode/electrolyte-membrane assembly B was held between metal separators in which gas feeding channels were formed. Thus, a solid polymer electrolyte type fuel cell B was formed. In the solid polymer electrolyte type fuel cell B, the catalyst layer according to the present invention was used as a cathode. The amount of catalyst in the cathode was about 0.2 mg/cm$^2$, and the amount of catalyst in the anode was about 0.2 mg/cm$^2$.

Comparative Example 1

In the same manner as in Example 1, a Nafion 115 membrane was cleaned with purified water three times; boiled in 3% hydrogen peroxide water for 1 hour and then cleaned with purified water several times as degreasing treatment; further boiled in 0.5 M of sulfuric acid for 1 hour as protonating treatment; cleaned with purified water several times; and then kept in purified water.

Next, a peeling paper/catalyst dispersions coated body A in which a catalyst layer was formed on peeling paper was produced in the same manner as in Example 1. The producing method was as follows. 13 ml of 5 wt % Nafion solution (produced by Aldrich Company, U.S.A.) was gradually added to 1.5 g of carbon catalyst supporting 30 wt % of platinum while being agitated. They were agitated for 30 minutes. On this occasion, they were heated to 60° C. while being agitated and concentrated so that the weight of the solid content of Nafion was 18 wt % to the dispersion medium. Thus, catalyst dispersions A2 were prepared. This catalyst dispersions A2 were applied to a tetrafluoroethylene-hexafluoroethylene copolymer sheet by screen application. This sheet is the peeling paper/catalyst dispersions coated body A was produced, and cut into a circle with a diameter of 3 cm.

The peeling paper/catalyst dispersions coated body A was laminated on each side of the Nafion 115 membrane subjected to pretreatment, and disposed on a pressing machine. At that time, they were laminated so that the coating surfaces of the peeling paper/catalyst dispersions coated bodies A were on the electrolyte membrane side, and the respective coating surfaces met each other through the electrolyte membrane. In this state, they were heated and pressure-welded by 250 kg/cm$^2$ at 135° C. for 5 minutes. As a result, the catalyst layers of the peeling paper/catalyst dispersions coated bodies A were transferred from the peeling paper to the electrolyte membrane. Thus, a catalyst-layer/electrolyte-membrane assembly in which a catalyst layer composed of the catalyst dispersions A2 was provided on each side of the Nafion 115 membrane was formed. This catalyst-layer/electrolyte-membrane assembly was regarded as a catalyst-layer/electrolyte-membrane assembly C.

Gas diffusion layers were joined. Carbon paper having hydrophobicity was cut into circles with a diameter of 3 cm as gas diffusion layers respectively, disposed on opposite sides of the catalyst-layer/electrolyte-membrane assembly C, and joined integrally by heating and pressure welding by 120 Kg/cm$^2$, at 135° C. for 5 minutes. Thus, a gas diffusion-electrode/electrolyte-membrane assembly C was produced. The carbon paper used thus was 0.2 mm thick. This carbon paper was impregnated with fluid dispersion of polytetrafluoroethylene, dried, and then burned at 400° C. so that hydrophobicity was given to the carbon paper.

The gas diffusion-electrode/electrolyte-membrane assembly C was held between metal separators in which gas feeding channels were formed. Thus, a conventional solid polymer electrolyte type fuel cell C was formed. The amount of catalyst in the cathode was about 0.2 mg/cm$^2$, and the amount of catalyst in the anode was about 0.2 mg/cm$^2$.

Figure 4:
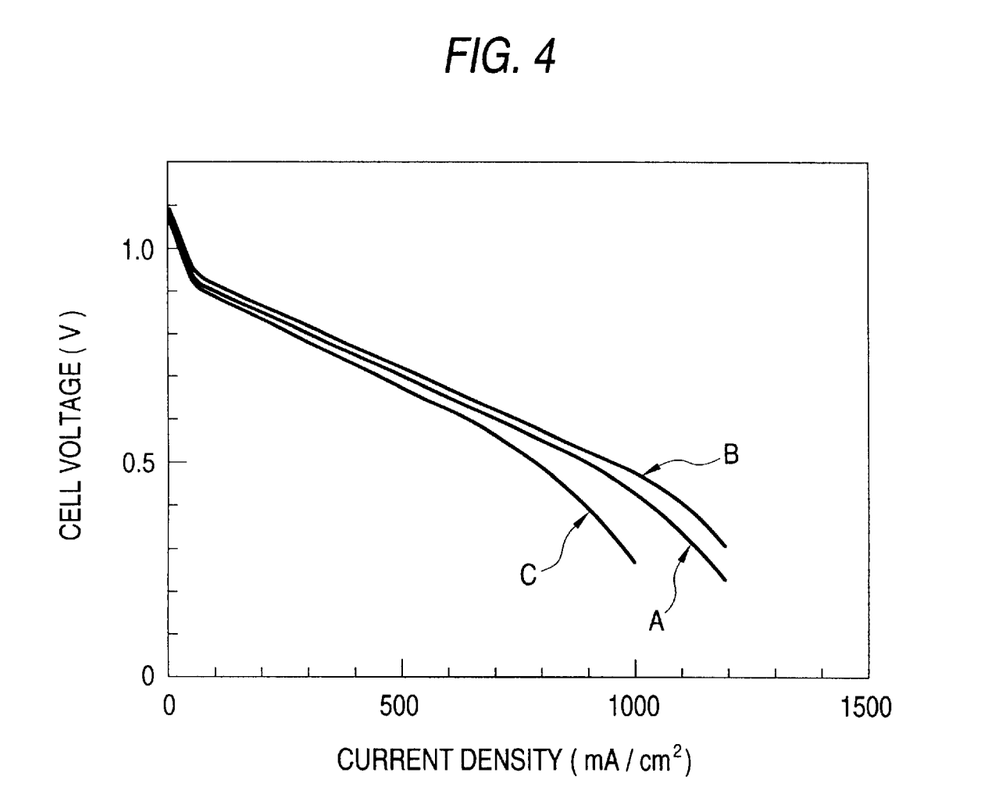
FIG. 4 is a graph showing current-voltage characteristics of solid polymer electrolyte type fuel cells A and B each provided with a gas diffusion electrode as a cathode according to the present invention, and a background-art solid polymer electrolyte type fuel cell C.

FIG. 4 shows current-voltage characteristics of the solid polymer electrolyte type fuel cells A, B and C.

This power generation test was performed in the following conditions. Pure hydrogen and the air were fed to an anode and a cathode under the pressure of 0.2 Mpa respectively. At that time, the air and hydrogen were humidified by a bubbler-type humidifier set at 60° C. The temperature of each cell was set to 65° C.

In the solid polymer electrolyte type fuel cells A and B each provided with a gas diffusion electrode as a cathode according to the present invention, the lowering of the cell voltage in high current density was smaller than that in the conventional solid polymer electrolyte type fuel cell C, so that the solid polymer electrolyte type fuel cells A and B had high power. From this fact, it was confirmed that a catalyst layer provided with a porous electrolyte A having pores three-dimensionally communicating with one another and a micro-porous catalyst-electrolyte aggregate including a catalyst and an electrolyte B in the pores of the porous electrolyte A had an effect of making a fuel cell have high power.

In addition, the solid polymer electrolyte type fuel cell B was small in the lowering of cell voltage in higher current density so as to have high power. From this fact, it was indicated that a porous electrolyte A having a larger ion exchange capacity made a fuel cell had higher power.

As shown in FIG. 2, in the gas diffusion-electrode/electrolyte-membrane junction bodies A and B, a porous electrolyte A (2) having pores three-dimensionally communicating with one another are formed in a catalyst layer, so that the proton conductivity in the catalyst layer is improved. Further, in the gas diffusion-electrode/electrolyte-membrane assembly B, an electrolyte A (2) having pores three-dimensionally communicating with one another is large in the ion exchange capacity, so that the proton conductivity in the catalyst layer is progressed. It is considered that the lowering of cell voltage could be reduced even in high current density as a result of these improvements.

In a gas diffusion electrode according to the present invention, a porous electrolyte with pores three-dimensionally communicating with one another is provided in a catalyst layer so that a series of proton conductive channels are formed. As a result, the proton conductivity of the catalyst layer is improved. Since a micro-porous catalyst-electrolyte aggregate including a catalyst and an electrolyte is provided in the pores of the porous electrolyte, the area of three-phase interfaces is increased. As a result of these improvements, activation overvoltage of the electrode, resistance overvoltage thereof, so that a solid polymer electrolyte type fuel cell with high power density can be provided.

What is claimed is:

1. A gas diffusion electrode comprising a catalyst layer and a gas diffusion layer,
   wherein said catalyst layer comprises both porous electrolyte A;
      wherein the porous electrolyte A forms a skeleton structure having pores, and
      wherein said pores three-dimensionally communicate with one another;
   and a micro-porous catalyst-electrolyte aggregate including a catalyst and an electrolyte B in said pores.

2. The gas diffusion electrode according to claim 1, wherein an ion exchange capacity of said porous electrolyte A is larger than that of the electrolyte B in said pores.

3. The gas diffusion electrode according to claim 1, wherein said porous electrolyte A and said electrolyte B comprise perfluorosulfonic acid resin.

4. The gas diffusion electrode according to claim 2, wherein said porous electrolyte A and said electrolyte B comprise perfluorosulfonic acid resin.

5. A solid polymer electrolyte type fuel cell comprising a gas diffusion electrode according to any one of claims 1 to 4.

6. A method for manufacturing a gas diffusion electrode according to claim 1, comprising the step of: providing a micro-porous catalyst-electrolyte aggregate including a catalyst and an electrolyte B in pores of a porous electrolyte A which forms a skeleton structure having pores, and wherein said pores three-dimensionally communicate with one another.

* * * * *